No. 706,853. Patented Aug. 12, 1902.
J. C. SCANNELL.
SINEW EXTRACTOR.
(Application filed Apr. 14, 1902.)
(No Model.)
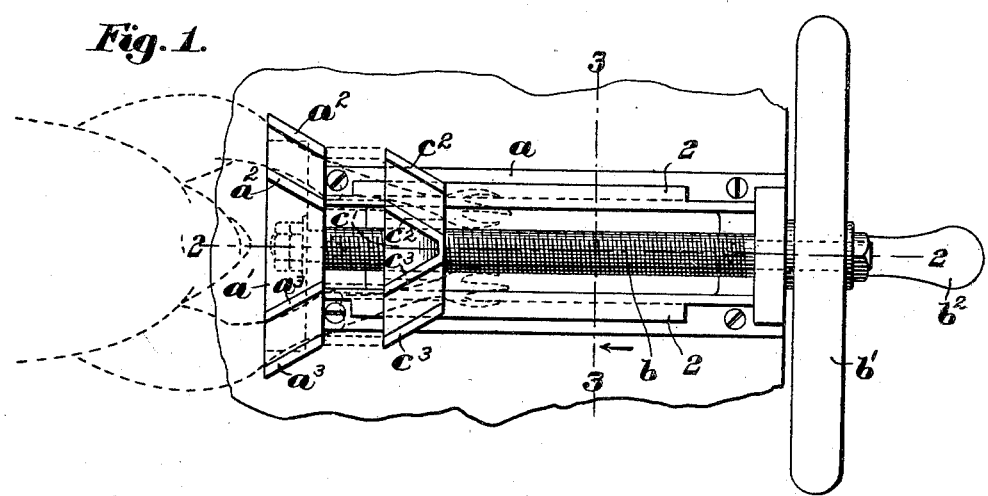
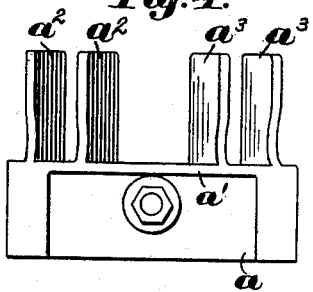
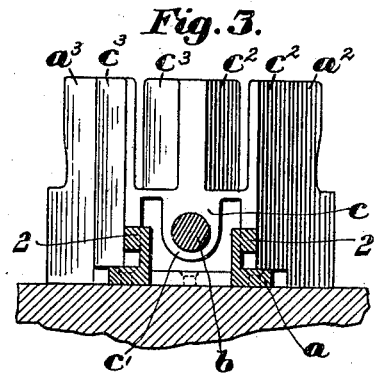
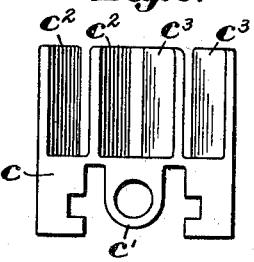
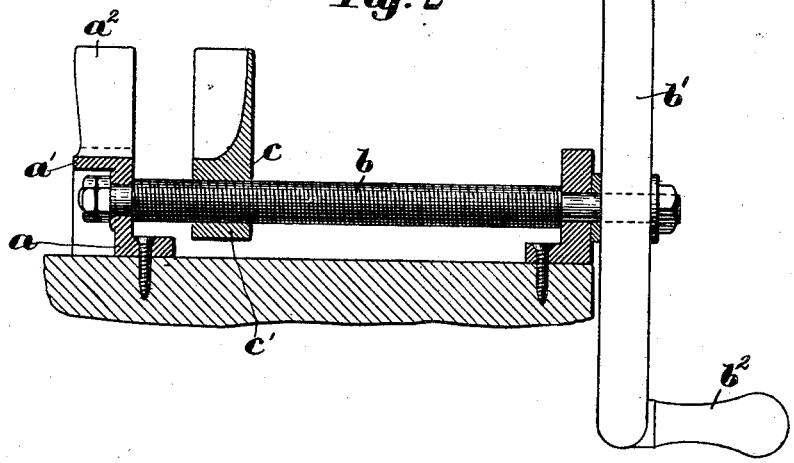
Witnesses:
Inventor:
Joseph C. Scannell
Attys.

UNITED STATES PATENT OFFICE.

JOSEPH C. SCANNELL, OF BOSTON, MASSACHUSETTS, ASSIGNOR, BY MESNE ASSIGNMENTS, TO SADIE SCANNELL, OF BOSTON, MASSACHUSETTS.

SINEW-EXTRACTOR.

SPECIFICATION forming part of Letters Patent No. 706,853, dated August 12, 1902.

Application filed April 14, 1902. Serial No. 102,751. (No model.)

*To all whom it may concern:*

Be it known that I, JOSEPH C. SCANNELL, of Boston, in the county of Suffolk and State of Massachusetts, have invented certain new and useful Improvements in Sinew-Extractors, of which the following is a specification.

This invention has for its object to provide an appliance adapted especially for use by dealers in poultry and game to break the lower joint of the legs of a fowl or bird and pull the same forcibly from the upper joint in such manner as to remove from the fleshy parts of the legs the sinews which are engaged with the lower portions of the legs broken off by the said appliance.

The invention consists in the improvements which I will now proceed to describe and claim.

Of the accompanying drawings, forming a part of this specification, Figure 1 represents a top plan view of my improved sinew-extractor. Fig. 2 represents a section on line 2 2 of Fig. 1. Fig. 3 represents a section on line 3 3 of Fig. 1. Fig. 4 represents a front view showing the fixed jaws. Fig. 5 represents a front view of the slide and the jaws thereon.

The same reference characters indicate the same parts in all the figures.

In the drawings, $a$ represents a supporting-frame adapted to be attached by screws or otherwise to a bench or table and provided at one end with a raised portion $a'$, on which are formed two pairs of upwardly-projecting jaws $a^2\ a^2\ a^3\ a^3$. These jaws are obliquely arranged with reference to the frame $a$, as shown in Fig. 1, and they are separated from each other by spaces of sufficient width to receive portions of the legs of a fowl, the said spaces being too narrow to receive the feet. Each pair of jaws constitutes a holder provided with a channel adapted to receive one of the legs. Each of said jaws is preferably a wing or ear cast upon the portion $a'$ of the frame.

$b$ represents a feed-screw, which is journaled in bearings at the opposite ends of the frame and extends substantially at right angles with the portion $a'$. The portions of the frame at the opposite sides of the feed-screw and parallel therewith are formed as guides 2 2.

$c$ represents a slide, which is movable on the guides 2 2 and is formed at its lower portion as a nut $c'$, engaged with the feed-screw $b$. On said slide are formed two pairs of upwardly-projecting jaws $c^2\ c^2$ and $c^3\ c^3$, which are formed like the jaws $a^2$ and $a^3$ and are also obliquely arranged. The arrangement of the jaws $c^3\ c^3$ is such that when the slide $c$ is moved up to the portion $a'$ of the frame the jaws $c^2\ c^3$ constitute extensions of the jaws $a^2\ a^3$, the spaces between the jaws being straight and practically continuous, so that the portions of the legs that are inserted between the fixed jaws extend therefrom into the spaces between the jaws on the slide $c$. The feed-screw $b$ is provided with a hand-wheel $b'$, having a suitable handle $b^2$.

It will be seen that when the lower portions of the legs of a fowl are placed in the oblique spaces between the jaws $a^2\ a^3$ and $c^2\ c^3$ and the screw is rotated to move the movable jaws away from the fixed jaws the oblique arrangement of the jaws will cause the portions of the legs engaged therewith to be broken between the jaws, the broken ends of the legs remaining in engagement with the movable jaws and being carried thereby away from the body portions of the legs, together with the sinews attached to the broken-off portions of the legs, said sinews being thus pulled from the fleshy portions of the legs.

It will be seen that this simple machine enables the operation of breaking off the lower ends of the legs and extracting the sinews to be very quickly and easily performed, relieving the operator of the severe strain and effort required to remove the sinews by muscular power, as heretofore. The relative arrangement of the jaws must be such that when the jaws are relatively close together the unbroken legs of a fowl may be readily inserted between both pairs of jaws, and when the distance of the jaws is increased a bending and breaking strain will be exerted on the legs. To this end it is essential that the distance between the pairs of movable jaws be less than the distance between the pairs of fixed jaws. It is not essential, however, that the jaws have the elongated oblique form here shown, although this form is preferable to any other known to me. The jaws may be of any other suitable form so long as the pairs of movable jaws are nearer together than the pairs of fixed jaws.

It is obvious that each side of the machine is an operative device which might be employed singly to break one leg at a time of a fowl.

I claim—

1. A sinew-extractor comprising two holders having channels adapted to receive one leg of a fowl, and provisions for relatively moving said holders into and out of a position substantially alining the said channels.

2. A sinew-extractor comprising two holders having channels adapted to receive one leg of a fowl, and provisions for imparting a movement of one of said holders relatively to the other in a path at an obtuse angle to the channels and into and out of a position substantially alining said channels.

3. A sinew-extractor comprising two fixed holders, two movable holders connected for operation in unison and located closer together than the fixed holders, said holders having channels adapted to receive the two legs of a fowl, and provisions for moving said movable holders in paths at an obtuse angle to the channels and into and out of positions substantially alining the channels.

In testimony whereof I have affixed my signature in presence of two witnesses.

JOSEPH C. SCANNELL.

Witnesses:
C. F. BROWN,
E. BATCHELDER.